(12) United States Patent
Shioda et al.

(10) Patent No.: US 6,798,376 B2
(45) Date of Patent: Sep. 28, 2004

(54) MOBILE COMMUNICATION APPARATUS AND POSITION DETECTION METHOD THEREOF

(75) Inventors: Takehiko Shioda, Saitama (JP); Manabu Nohara, Saitama (JP)

(73) Assignee: Pioneer Corporation, Tokyo (JP)

( * ) Notice: Subject to any disclaimer, the term of this patent is extended or adjusted under 35 U.S.C. 154(b) by 15 days.

(21) Appl. No.: 10/125,526

(22) Filed: Apr. 19, 2002

(65) Prior Publication Data

US 2002/0175854 A1 Nov. 28, 2002

(30) Foreign Application Priority Data

Apr. 20, 2001 (JP) ................................ P. 2001-123203

(51) Int. Cl.⁷ ................................................. G01S 5/14
(52) U.S. Cl. ........................... 342/357.02; 342/357.1; 342/464
(58) Field of Search ................... 342/357.14, 357.1, 342/463, 464; 455/456.1

(56) References Cited

U.S. PATENT DOCUMENTS

| | | | |
|---|---|---|---|
| 5,420,594 A | * 5/1995 | FitzGerald et al. | .... 342/357.14 |
| 5,774,829 A | 6/1998 | Cisneros et al. | |
| 5,936,572 A | * 8/1999 | Loomis et al. | ............. 342/457 |
| 5,982,324 A | 11/1999 | Watters et al. | |
| 5,999,126 A | * 12/1999 | Ito | ........................ 342/357.1 |
| 6,002,936 A | * 12/1999 | Roel-Ng et al. | ......... 455/456.4 |
| 6,166,685 A | * 12/2000 | Soliman | .................. 342/357.1 |
| 6,343,254 B1 | * 1/2002 | Kirk et al. | .................. 701/216 |

OTHER PUBLICATIONS

Japanese Abstract No. 2000102058, dated Jun. 7, 2000.

* cited by examiner

Primary Examiner—Gregory C. Issing
(74) Attorney, Agent, or Firm—Sughrue Mion, PLLC

(57) ABSTRACT

When position measurement accuracy of the present position which the base station distance and position measurement part measures from radio waves coming from base stations is not good, a GPS distance and position measurement part measures the present position from radio waves coming from GPS satellites. When position measurement accuracy of the present position obtained by the GPS distance and position measurement part is not good, a position measurement accuracy analysis part compounds the present position obtained by the base station distance and position measurement part with the present position obtained by the GPS distance and position measurement part, and calculates a new position within a range of overlap between a position measurement error of the present position obtained by the base station distance and position measurement part and a position measurement error of the present position obtained by the GPS distance and position measurement part.

12 Claims, 8 Drawing Sheets

MOBILE COMMUNICATION APPARATUS AND POSITION DETECTION METHOD THEREOF

BACKGROUND OF THE INVENTION

1. Field of the Invention

The present invention relates to a mobile communication apparatus such as a cellular phone, and a position detection method for detecting its position.

2. Description of the Related Art

Conventionally, a method for using radio waves coming from base stations and a method for mounting a GPS (Global Positioning System) receiver to use radio waves coming from GPS satellites have been known as a position detection method for detecting a position of a mobile communication apparatus such as a cellular phone or PDA (Personal Digital Assistants).

In the position detection method for using the radio waves coming from the base stations, the mobile communication apparatus measures each propagation time of the radio waves coming from the plural base stations constructed in a communication area (service area) of a mobile communication network. Then, by converting each the measured propagation time into a propagation distance and applying triangulation to make an analysis, the present position of the mobile communication apparatus is obtained.

In the position detection method for mounting the GPS receiver in the mobile communication apparatus to use the radio waves coming from the GPS satellites, the radio waves coming from the plural GPS satellites are received by the GPS receiver and each propagation time of the incoming radio waves is measured. Then, by converting each the measured propagation time into a propagation distance and applying triangulation to make an analysis, the present position of the mobile communication apparatus is obtained.

However, the conventional position detection method for using the radio waves coming from the base stations is susceptible to multi-path fading. Therefore, there was a problem that a case that the present position of the mobile communication apparatus cannot be obtained with high accuracy occurs.

That is, there is a case that the radio waves emitted from the base stations are reflected by buildings and become a multi-path wave and reach the mobile communication apparatus, and even when propagation time of this multi-path wave is measured and is converted into a propagation distance, the propagation distance does not indicate a linear distance between the base station and the mobile communication apparatus. Because of this, even when the propagation distance obtained from the multi-path wave is applied to the triangulation, there was the problem that the case that the present position of the mobile communication apparatus cannot be obtained with high accuracy occurs.

Particularly, in a place where buildings of a city are crowded, a case that the multi-path wave is received and the propagation distance is measured often occurs, so that it became difficult to improve accuracy of position detection.

In the conventional position detection method for mounting the GPS receiver and performing the detection, there was a problem that power consumption becomes large.

That is, since the power consumption is large in the GPS receiver, when the GPS receiver is mounted in a mobile communication apparatus with a small battery capacity and position detection is performed, operable time of the mobile communication apparatus becomes short and there was a problem that a result that loses excellent portability which the mobile communication apparatus has essentially is caused.

Also, since there is a case that the radio waves from the GPS satellites cannot be received within a shield such as a tunnel or a building, there was a case that a situation in which position detection cannot be performed is caused.

SUMMARY OF THE INVENTION

The invention is implemented in view of the conventional problems, and an object of the invention is to provide a mobile communication apparatus capable of detecting a position of the mobile communication apparatus with higher accuracy and a position detection method thereof.

Another object of the invention is to provide a mobile communication apparatus for detecting a position of the mobile communication apparatus with more reliability and a position detection method thereof.

A further object of the invention is to provide a mobile communication apparatus capable of reducing power consumption and a position detection method thereof.

In order to achieve the objects, there are provided a mobile communication apparatus and a position detection method, wherein the present position of the mobile communication apparatus from radio waves coming from base stations and a position measurement error are measured and the position measurement error is compared with a predetermined criterion and the present position of the mobile communication apparatus is measured from radio waves coming from GPS satellites when the position measurement error exceeds the predetermined criterion.

A measurement error of the present position of the mobile communication apparatus measured from the radio waves coming from the GPS satellites is compared with a predetermined criterion and when it is decided that the measurement error of the present position measured from the radio waves coming from the GPS satellites exceeds the predetermined criterion, a new present position is calculated within a range of overlap between the position measurement error of the present position obtained from the radio waves coming from the base stations and the position measurement error of the present position obtained from the radio waves coming from the GPS satellites.

According to such a mobile communication apparatus and a position detection method, the present position of the mobile communication apparatus from radio waves coming from base stations and a position measurement error are first measured and the position measurement error is compared with a predetermined criterion and when the position measurement error does not exceed the predetermined criterion, the present position obtained from the radio waves coming from the base stations is set to a true present position of the mobile communication apparatus. As a result of this, power consumption necessary to make distance measurement and position measurement of the present position of the mobile communication apparatus from the radio waves coming from the GPS satellites is reduced.

Then, when the position measurement error at the time of obtaining the present position of the mobile communication apparatus from the radio waves coming from the base stations exceeds the predetermined criterion, the present position of the mobile communication apparatus is measured from the radio waves coming from the GPS satellites.

Also, when the measurement error of the present position of the mobile communication apparatus measured from the radio waves coming from the GPS satellites exceeds the predetermined criterion, a new present position is calculated within a range of overlap between the position measurement error of the present position obtained from the radio waves coming from the base stations and the position measurement error of the present position obtained from the radio waves coming from the GPS satellites.

When a range of overlap between such position measurement errors is obtained, the overlap range becomes a range indicating the present position with position measurement accuracy higher than that of the present position obtained from the radio waves coming from the base stations and the present position obtained from the radio waves coming from the GPS satellites, and by calculating a new present position within this overlap range, more proper present position of the mobile communication apparatus is obtained.

DETAILED DESCRIPTION OF THE PRESENT INVENTION

The present invention will be described in detail with reference to the accompanying drawings. A cellular phone for conducting wireless communications with base stations using a wide band CDMA (Code Division Multiple Access) method which is one kind of a spread spectrum (SS) communication method will be described as a mobile communication apparatus of the embodiment.

Figure 1:
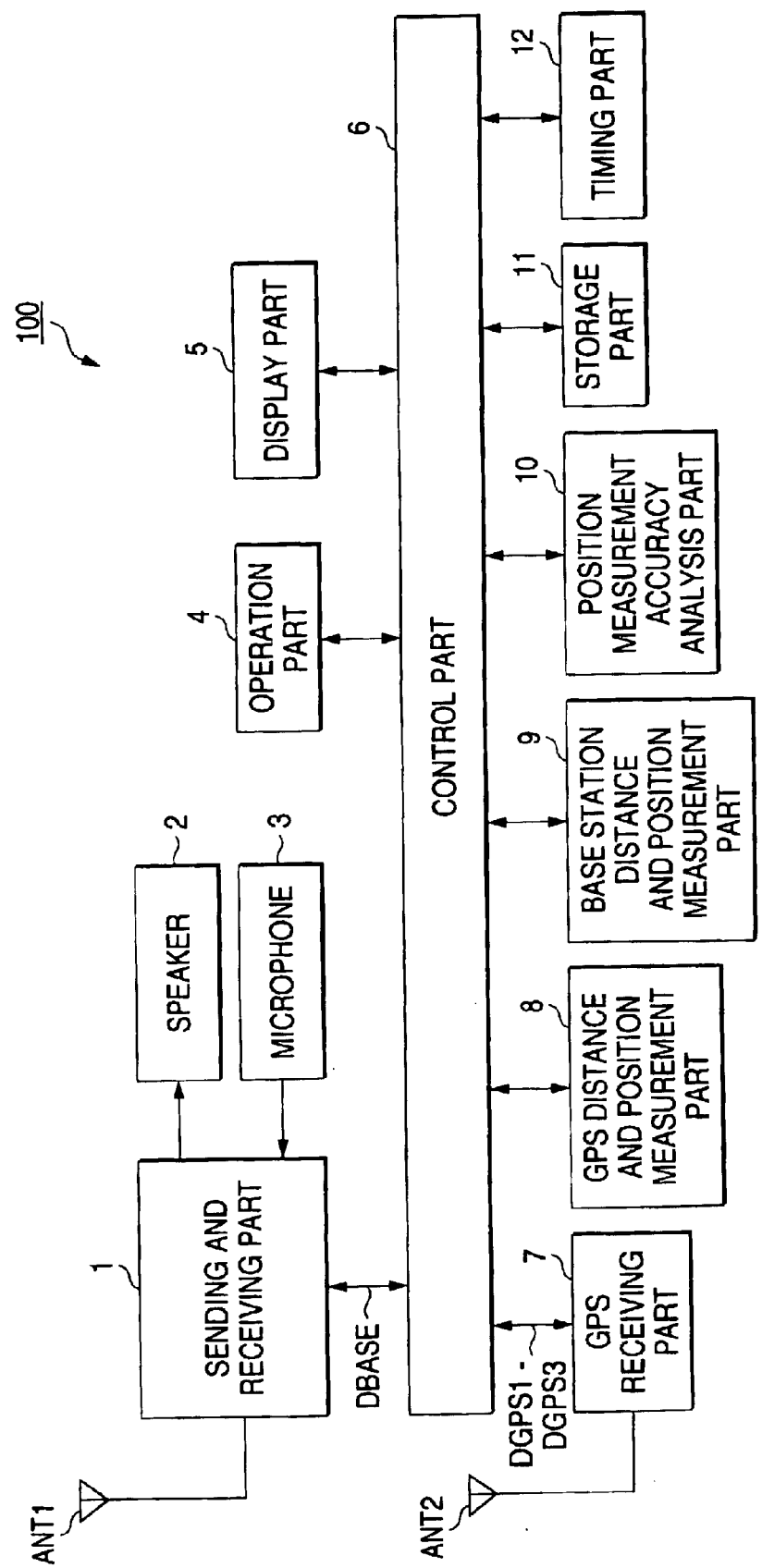
FIG. 1 is a block diagram showing a configuration of a cellular phone of an embodiment of the invention.

FIG. 1 is a block diagram showing a configuration of the present cellular phone.

The cellular phone is provided with a sending and receiving antenna ANT1 for delivering radio waves with base stations and a sending and receiving part 1 for conducting communications with the base stations through the sending and receiving antenna ANT1.

Further, there are provided a speaker 2 and a microphone 3 which a user of the cellular phone 100 uses in the case of a call, an operation part 4 equipped with plural operation buttons (omitted in the drawing) in which the user selects various functions provided in the cellular phone 100, a display part 5 for performing display for offering various report information to the user, a control part 6 for controlling operations of the entire cellular phone 100 by providing a microprocessor (MPU), a storage part 11 formed by semiconductor memory, and a timing part 12 for making time measurement by providing a time base.

Application programs and system programs are previously stored in the storage part 11 and the control part 6 is constructed so as to perform control for position measurement and control of the entire cellular phone 100 by executing these programs. Also, when a predetermined timing value (time to be timed) is instructed from the control part 6, the timing part 12 starts timing operations and manages elapsed time necessary to reach the instructed timing value and also supplies data of the elapsed time to the control part 6.

The cellular phone 100 is provided with a GPS receiving antenna ANT2 for receiving radio waves coming from GPS satellites and a GPS receiving part 7 for reproducing data DGPS (hereinafter called "GPS data") sent by the GPS satellites by demodulating an output of the GPS receiving antenna ANT2.

There are provided a GPS distance and position measurement part 8 for measuring a position of the cellular phone 100 from the GPS data DGPS, a base station distance and position measurement part 9 for measuring a position of the cellular phone 100 from data DBASE (hereinafter called "base station data") demodulated by the sending and receiving part 1, and a position measurement accuracy analysis part 10 for finally obtaining a position of the cellular phone 100 from a position measurement result obtained by the GPS distance and position measurement part 8 and a position measurement result obtained by the base station distance and position measurement part 9.

Figure 2:
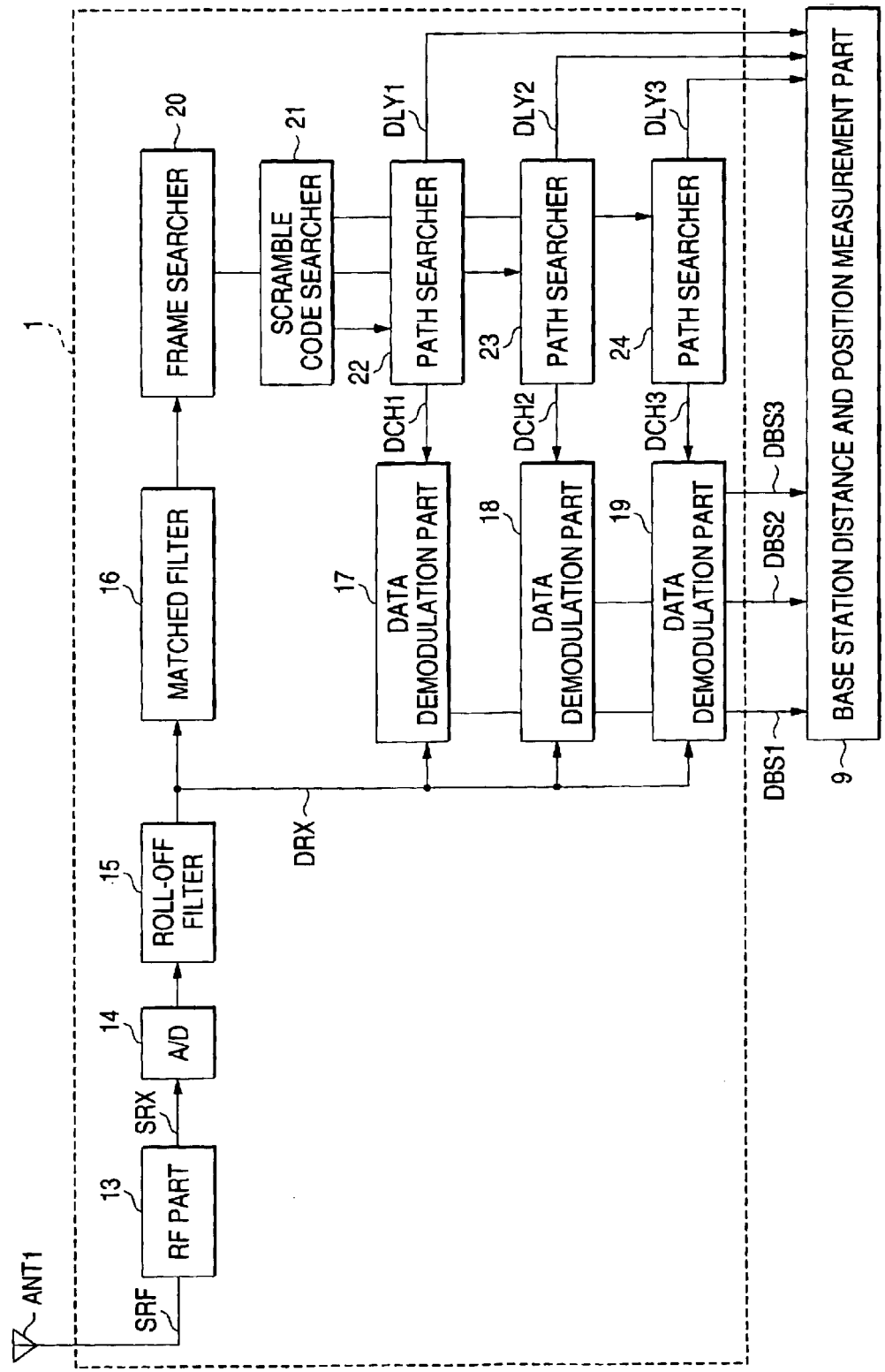
FIG. 2 is a block diagram showing a configuration of a sending and receiving part.

The sending and receiving part 1 has a configuration shown in FIG. 2. Incidentally, the sending and receiving part 1 is provided in order to perform sending and receiving of a call or electronic mail and sending and receiving of multimedia information with the base stations. However, for convenience of description, only the receiving part for receiving the radio waves coming from the base stations is shown in FIG. 2.

In FIG. 2, when the sending and receiving antenna ANT1 receives the radio waves coming from the plural base stations, a high-frequency band signal SRF outputted from the sending and receiving antenna ANT1 is supplied to an RF part 13, and the RF part 13 down-converts the high-frequency band signal SRF into a receiving signal SRX with an intermediate frequency band capable of signal processing and supplies it to an A/D converter 14 and further in the A/D converter 14, analog-to-digital conversions of the receiving signal SRX into received data are made and the A/D converter 14 supplies it to a roll-off filter 15.

The roll-off filter 15 is formed of a digital filter set to a predetermined passing frequency band, and eliminates a noise component from the received data supplied, and supplies the received data DRX in which the noise component is eliminated to a matched filter 16 and data demodulation parts 17, 18, 19.

The matched filter 16 is formed of a correlator, and detects a slot interval of the received data DRX by correlatively calculating the received data DRX and symbol data for slot detection preset, and supplies the detection result and the received data DRX to a frame searcher 20.

The frame searcher 20 detects a frame of the received data DRX from the slot interval detected by the matched filter 16, and supplies the received data DRX to a scramble code searcher 21 every the detected frame.

The scramble code searcher 21 detects scramble codes predefined by standards in order to identify the base stations from the received data DRX every the frame supplied from the frame searcher 20, and detects the three base stations from which radio waves are emitted based on the three scramble codes detected. Then, detection results (three detection results) of the scramble codes are divided and supplied to three path searchers 22, 23, 24. Further, the received data DRX every the frame is divided and supplied from the scramble code searcher 21 to each the path searcher 22, 23, 24 every base station.

The path searchers 22, 23, 24 supply inverse diffusion code sequences DCH1, DCH2, DCH3 for demodulating the received data DRX based on the detection results of the scramble codes to the data demodulation parts 17, 18, 19.

Figure 3:
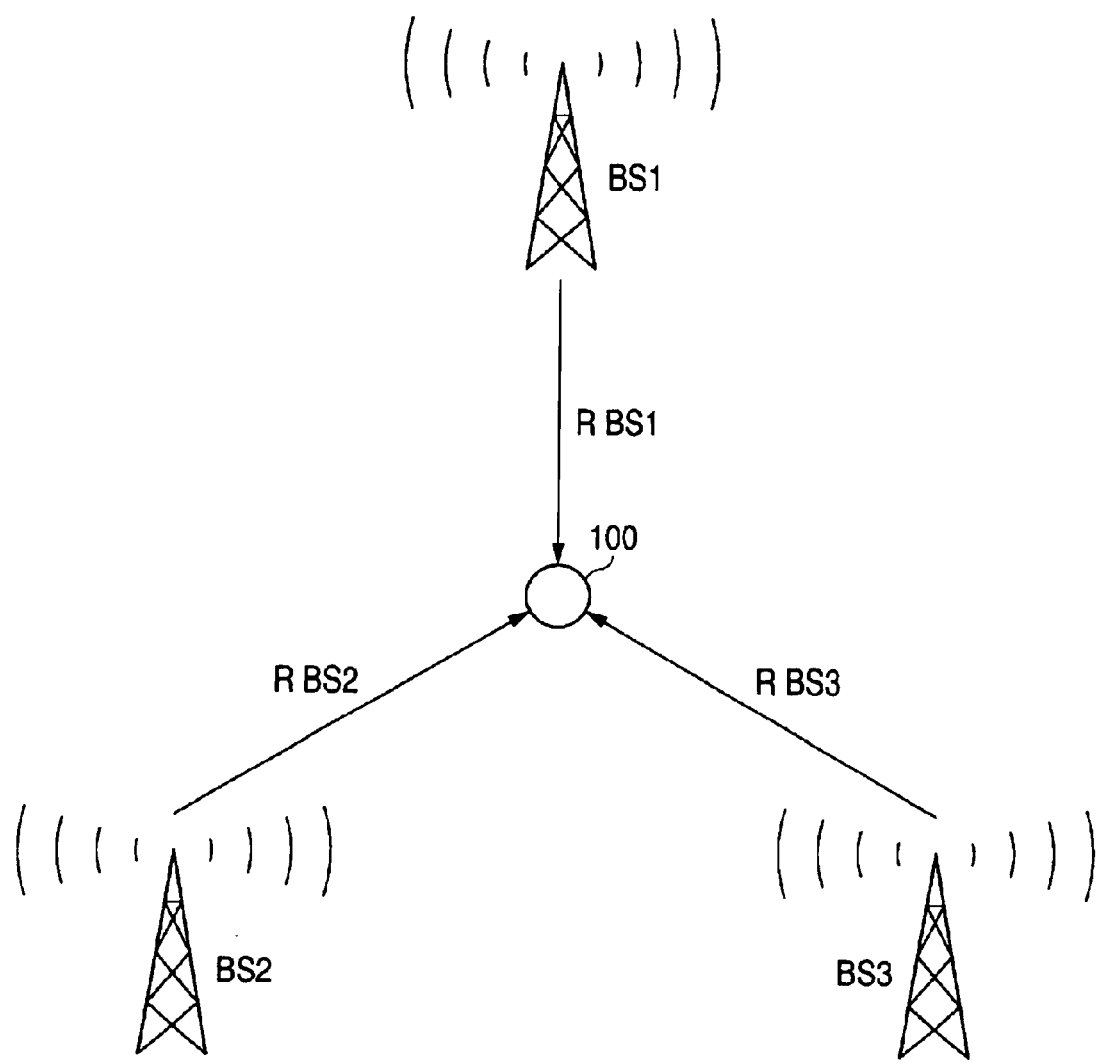
FIG. 3 is a diagram showing a distance measurement principle in the case of obtaining a propagation distance from radio waves coming from base stations.

That is, as illustrated in FIG. 3, when the scramble code searcher 21 detects scramble codes of three base stations BS1, BS2, BS3 by receiving radio waves coming from at least the three base stations BS1, BS2, BS3 placed around the cellular phone 100, detection results of each the scramble code are divided every base station and are supplied to each the path searcher 22, 23, 24 so that a detection result of the scramble code of the base station BS1 is supplied to the path searcher 22 and a detection result of the scramble code of the base station BS2 is supplied to the path searcher 23 and a detection result of the scramble code of the base station BS3 is supplied to the path searcher 24.

Then, the inverse diffusion code sequence DCH1 corresponding to the base station BS1 illustrated above is supplied from the path searcher 22 to the data demodulation part 17, and the inverse diffusion code sequence DCH2 corresponding to the base station BS2 is supplied from the path searcher 23 to the data demodulation part 18, and the inverse diffusion code sequence DCH3 corresponding to the base station BS3 is supplied from the path searcher 24 to the data demodulation part 19.

The data demodulation part 17 demodulates the radio waves coming from the base station BS1 by correlatively calculating the inverse diffusion code sequence DCH1 and the received data DRX and integrating the correlative result and performing processing for obtaining the so-called path diversity effect by a rake receiving part (omitted in the drawing). That is, by performing inverse diffusion processing of the received data DRX by the inverse diffusion code sequence DCH1, the demodulation described above is performed and demodulation data DBS1 obtained is supplied to the base station distance and position measurement part 9 through the control part 6.

The data demodulation parts 18 and 19 also have a configuration similar to that of the data demodulation part 17, and the data demodulation part 18 demodulates the radio waves coming from the base station BS2 by performing inverse diffusion processing of the received data DRX by the inverse diffusion code sequence DCH2 and also supplies the demodulation data DBS2 to the base station distance and position measurement part 9 through the control part 6, and the data demodulation part 19 demodulates the radio waves coming from the base station BS3 by performing inverse diffusion processing of the received data DRX by the inverse diffusion code sequence DCH3 and also supplies the demodulation data DBS3 to the base station distance and position measurement part 9 through the control part 6.

Further, the path searchers 22, 23, 24 described above divide the received data DRX supplied through the scramble code searcher 21 into received data DLY1, DLY2, DLY3 every the base stations BS1, BS2, BS3 and supply the data to the base station distance and position measurement part 9 through the control part 6.

In this manner, the sending and receiving part 1 is constructed so as to supply the demodulation data DBS1, DBS2, DBS3 obtained from the radio waves coming from at least the three base stations placed around the cellular phone 100 and the received data DLY1, DLY2, DLY3 divided every the base stations to the base station distance and position measurement part 9 as the base station data DBASE.

The base station distance and position measurement part 9 measures a propagation distance of the incoming radio waves from the base station data DBASE supplied from the sending and receiving part 1, and further obtains the present position Pb (x, y) by position measurement processing and a position measurement error HDOPb indicating position measurement accuracy, and supplies data of these present position Pb (x, y) and position measurement error HDOPb to the position measurement accuracy analysis part 10 as position measurement results.

Here, the base station distance and position measurement part 9 obtains a propagation distance of the radio waves coming from the base stations by the following distance measurement processing.

First, time information included in the demodulation data DBS1, DBS2, DBS3 supplied by the sending and receiving part 1 is detected, and time at which a radio wave is emitted from each the base station (hereinafter called "base station radio wave emission time") is acquired. In other words, time information with very high accuracy indicating time at which each the base station emits a radio wave is included in the radio wave coming from each the base station, so that the base station radio wave emission time every base station is acquired from each the time information included in the demodulation data DBS1, DBS2, DBS3 obtained by the demodulation processing described above.

Next, the base station radio wave emission time is set to base time, and the peak of a change in each a level of the received data DLY1, DLY2, DLY3 supplied sequentially is detected, and it is decided that a time interval from the base time to a point in time when the peak arises is propagation time.

Figure 4A:
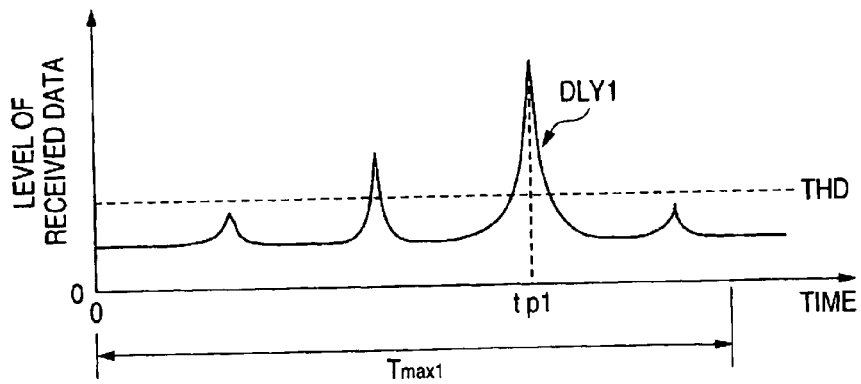
FIGS. 4A to 4C are diagrams further showing the distance measurement principle in the case of obtaining the propagation distance from the radio waves coming from the base stations.
Figure 4B:
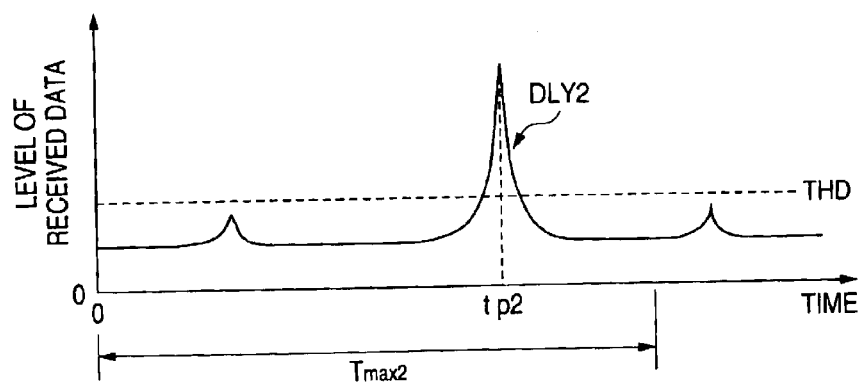
Figure 4C:
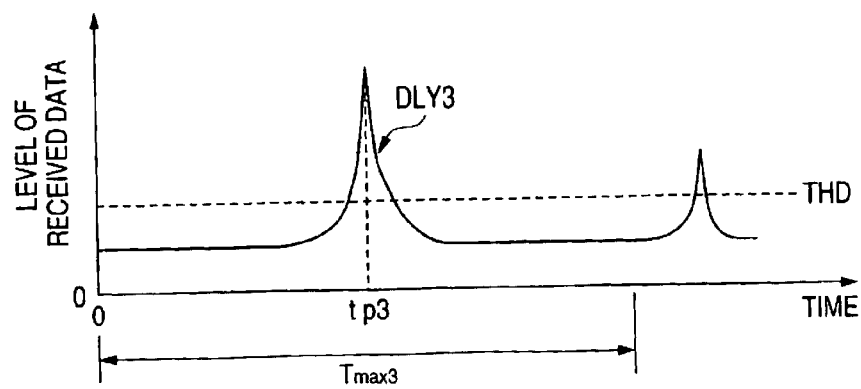

Referring particularly to FIGS. 4A to 4C, the propagation time is obtained in the following manner. Incidentally, FIG. 4A illustrates a change in levels of the received data DLY1 obtained from the radio waves coming from the base station BS1, and FIG. 4B illustrates a change in levels of the received data DLY2 obtained from the radio waves coming from the base station BS2, and FIG. 4C illustrates a change in levels of the received data DLY3 obtained from the radio waves coming from the base station BS3.

When base station radio wave emission time of the base station BS1 is detected from the time information included in the demodulation data DBS1 in FIG. 4A, the base station radio wave emission time is set to an initial point (zero point) on the time axis. Then, the peak of levels of the received data DLY1 supplied sequentially with a lapse of time from the initial point is detected and further in the case of this peak detection, a point in time of occurrence of the peak is detected by detecting a level larger than a predetermined threshold THD set for noise elimination as the peak.

Further, since a communicable service area of the base station BS1 is predetermined, when it is decided that the radio wave coming from the base station BS1 has been received by the demodulation data DBS1, time necessary for the radio wave to propagate a distance equivalent to an approximately radius of the service area is set to a peak detection period Tma1 and a point in time of occurrence (time) tp1 of the peak which becomes the maximum level within the peak detection period Tma1 is detected. Incidentally, data of the peak detection period Tma1 is stored in the storage part 11.

Then, a propagation distance RBS1 (=tp1×c) of the radio wave coming from the base station BS1 is measured by multiplying the point in time of occurrence (time) tp1 by a propagation speed c of the radio wave.

Propagation distances RBS2, RBS3 of each the radio wave coming from the base stations BS2, BS3 are also constructed so as to be obtained by distance measurement processing similar to that of the propagation distance RBS1 of the radio wave coming from the base station BS1.

In other words, each the base station radio wave emission time of the base stations BS2, BS3 is detected from each the time information included in the demodulation data DBS2, DBS3 and the respective base station radio wave emission times are set to initial points (zero points) on the time axes shown in FIGS. 4B and 4C. Then, the peaks of levels of each the received data DLY2, DLY3 supplied sequentially with a lapse of time from each the initial point are detected on the basis of a condition similar to that of the case of the received data DLY1, and points in time of occurrence (time) tp2, tp3 of the peaks which become the maximum levels within peak detection periods Tma2, Tma3 determined by communicable service areas of the base stations BS2, BS3 are detected.

Then, propagation distances RBS2 (=tp2×c) and RBS3 (=tp3×c) of each the radio wave coming from the base stations BS2, BS3 are measured by converting each the point in time of occurrence (time) tp2, tp3 into a distance.

Since the propagation distances RBS1, RBS2, RBS3 obtained in this manner are a propagation distance of a multi-path wave rather than a propagation distance of a direct wave or include various errors according to conditions of communication environments, it is difficult to obtain the present position of the cellular phone 100 with high accuracy even when these propagation distances RBS1, RBS2, RBS3 are applied to the conventional triangulation and position measurement processing is performed, but in the embodiment, it is constructed so that influence of the multi-path wave or the conditions of communication environments is suppressed to obtain a position of the cellular phone 100 with high accuracy by performing the position measurement processing by triangulation to which a Markov decision process by a successive approximation method described next is applied. Also, the position measurement accuracy analysis part 10 described below is constructed so as to finally obtain a position of the cellular phone 100 with higher accuracy.

Next, the base station distance and position measurement part 9 performs position measurement processing by triangulation to which a successive approximation method is applied when the propagation distances RBS1, RBS2, RBS3 are obtained by the distance measurement processing described above.

In this position measurement processing, the present position Pb (x, y) of the cellular phone 100 is obtained as data of latitude and longitude y in a horizontal plane.

Incidentally, it is constructed so as to perform the position measurement processing based on the following principle.

When respective latitudes and longitudes of the base stations BS1, BS2, BS3 are expressed as $(x_1, y_1)$, $(x_2, y_2)$, $(x_3, y_3)$, latitude x and longitude y of the present position Pb (x, y) of the cellular phone 100 are expressed by the following formulas (1) to (3) if the propagation distances RBS1, RBS2, RBS3 obtained by the position measurement processing described above are linear distances from each the base station BS1, BS2, BS3 to the cellular phone 100 and do not include an error.

$$RBS1=[(x-x_1)^2+(y-y_1)^2]^{1/2} \quad (1)$$

$$RBS2=[(x-x_2)^2+(y-y_2)^2]^{1/2} \quad (2)$$

$$RBS3=[(x-x_3)^2+(y-y_3)^2]^{1/2} \quad (3)$$

Then, the respective latitudes and longitudes $(x_1, y_1)$, $(x_2, y_2)$, $(x_3, y_3)$ of the base stations BS1, BS2, BS3 are known parameters and can be obtained from the demodulation data DBS1, DBS2, DBS3, so that latitude x and longitude y indicating the present position Pb (x, y) of the cellular phone 100 are obtained theoretically when the formulas (1) to (3) are expanded.

However, the propagation distances RBS1, RBS2, RBS3 are parameters influenced by multi-path fading or noise and also an error may occur between the base stations BS1, BS2, BS3 and a time base (time measurement circuit) built into the cellular phone 100, so that the present position of the cellular phone 100 cannot actually be obtained with high accuracy even when the formulas (1) to (3) are merely expanded.

Thus, the influence amount in which an error of a time measurement result of the base stations BS1, BS2, BS3 and each the time base of the cellular phone 100 at the time of receiving the incoming radio waves influences the propagation distances RBS1, RBS2, RBS3 is set to s and further, latitude x and longitude y of the present position Pb (x, y) are expressed as the following formulas (4) to (6).

$$x=x'+\Delta x \quad (4)$$

$$y=y'+\Delta y \quad (5)$$

$$s=s'+\Delta s \quad (6)$$

That is, variables x', y' and s' are set to approximate values and variables $\Delta x$, $\Delta y$ and $\Delta s$ are set to correction values, and latitude x is expressed as the sum of the approximate value x' and the correction value $\Delta x$, and longitude y is expressed as the sum of the approximate value y' and the correction value $\Delta y$, and the influence amount s is expressed as the sum of the approximate value s' and the correction value $\Delta s$.

Further, it is expressed as the following formulas (7) to (9) grounded on facts by applying the formulas (4) to (6) to the formulas (1) to (3).

$$RBS1=[(x'-x_1)^2+(y'-y_1)^2]^{1/2}+s \quad (7)$$

$$RBS2=[(x'-x_2)^2+(y'-y_2)^2]^{1/2}+s \quad (8)$$

$$RBS3=[(x'-x_3)^2+(y'-y_3)^2]^{1/2}+s \quad (9)$$

Then, by the successive approximation method, calculation is repeated until the correction values $\Delta x$, $\Delta y$, $\Delta s$ converge to a level of a calculation error (namely, converge to zero unlimitedly) and a position Pb (x', y') by the approximate value x' of latitude and the approximate value y' of longitude obtained by the calculation is set to the present position Pb (x, y) of the cellular phone 100.

In other words, in the first calculation by the successive approximation method, the base station distance and position measurement part 9 obtains the first latitude x and longitude y by setting the correction values $\Delta x$, $\Delta y$, $\Delta s$ to proper values, and respectively adds the correction values $\Delta x$, $\Delta y$, $\Delta s$ at that time to the approximate values x', y', s' to attain a solution for the present.

Next, in the case of obtain new latitude x and longitude y, the next latitude x and longitude y are obtained by replacing the new latitude x and longitude y with the sum of the solution attained for the present and the correction values $\Delta x$, $\Delta y$, $\Delta s$ and again setting the correction values $\Delta x$, $\Delta y$, $\Delta s$ to proper values, and the correction values $\Delta x$, $\Delta y$, $\Delta s$ obtained at that time are added to the approximate values x', y', s' to attain the next solution. Then, when the correction values Δx, Δy, Δs do not converge to a level of a calculation error yet, similar processing is further repeated until the correction values Δx, Δy, Δs converge to the level of the calculation error.

When the calculation is repeated in this manner, the correction values Δx, Δy, Δs gradually converge to the level of the calculation error and at the time when they do not converge any more (they becomes small to the level of the calculation error), the calculation is stopped and it is constructed so as to make distance measurement by setting a position Pb (x', y') by the approximate value x' of latitude and the approximate value y' of longitude obtained finally to the present position Pb (x, y) of the cellular phone 100.

Further, the present position Pb (x, y) obtained by the successive approximation method may include various errors (namely, position measurement errors having a bad influence on position measurement accuracy) according to communication environments between the base stations BS1, BS2, BS3 and the cellular phone 100.

Thus, a position measurement error HDOPbase is obtained by applying the following algorithm.

First, partial differential equations in which the formulas (7) to (9) are partially differentiated with respect to latitude x' and longitude y' are obtained and their partial differential equations are expressed by a determinant of the following formula (10).

$$\begin{pmatrix} \cdot 1 & \cdot 1 & 1 \\ \cdot 2 & \cdot 2 & 1 \\ \cdot 3 & \cdot 3 & 1 \end{pmatrix} \begin{pmatrix} .x \\ .y \\ s \end{pmatrix} = \begin{pmatrix} .PR_1 \\ .PR_2 \\ .PR_3 \end{pmatrix} \quad (10)$$

When expressed by the determinant in this manner, terms Δx, Δy of the determinant are the correction values described above, and a term s is the influence amount described above, and terms $\alpha_1$ to $\alpha_3$, $\beta_1$ to $\beta_3$ become parameters having properties to become a direction cosine in the case of viewing the cellular phone 100 from each the base station BS1, BS2, BS3. Further, as expressed by the following formulas (11) to (13), terms Δ PR1 to ΔPR3 are expressed as a difference between the actual propagation distances RBS1, RBS2, RBS3 obtained by the distance measurement processing described above and propagation distances RT1, RT2, RT3 of direct waves from each the base station BS1, BS2, BS3 to the cellular phone 100 obtained finally by the successive approximation.

$$RBS1-RT1=\Delta PR1 \quad (11)$$

$$RBS2-RT2=\Delta PR2 \quad (12)$$

$$RBS3-RT3=\Delta PR3 \quad (13)$$

Further, for the sake of convenience, the determinant (10) is expressed by the following formula (14) and further, when the following formula (14) is modified in form of the following formula (15), it becomes a determinant for obtaining the terms Δx, Δy, s:

$$A \cdot \delta X = \delta R \quad (14)$$

$$\delta X = A^{-1} \cdot \delta R \quad (15)$$

Then, as shown in the following formula (16), a covariance matrix $(A^T \cdot A)^{-1}$ is derived from the formula (15):

$$COV(\delta X) = A^{-1} \cdot COV(\delta R) \cdot (A^{-1})T \approx (A^T \cdot A)^{-1} \quad (16)$$

When the covariance matrix $(A^T \cdot A)^{-1}$ is derived in this manner, as expressed by the following formula (17), terms in which variances $\alpha_{xx}$ to $\alpha_{ss}$ having properties of a weight factor having a bad influence on position measurement accuracy according to communication environments are respectively squared are obtained, and as these variances $\alpha_{xx}$ to $\alpha_{ss}$ are smaller values, in the present position Pb (x', y') obtained by the successive approximation, a position measurement error is small and position measurement accuracy is high.

$$(A^T \cdot A)^{-1} = \begin{pmatrix} \sigma_{xx}^2 & \sigma_{xy}^2 & \sigma_{xs}^2 \\ \sigma_{yx}^2 & \sigma_{yy}^2 & \sigma_{ys}^2 \\ \sigma_{sx}^2 & \sigma_{sy}^2 & \sigma_{ss}^2 \end{pmatrix} \quad (17)$$

Thus, as shown in the following formula (18), a value HDOPbase in which the variances $\alpha_{xx}$ and $\alpha_{yy}$ are respectively squared to add them and further square root of them is performed is set to a position measurement error in a horizontal coordinate plane.

$$HDOP = \sqrt{\sigma_{xx}^2 + \sigma_{yy}^2} \quad (18)$$

Then, the base station distance and position measurement part 9 supplies data of the present position Pb (x, y) of the cellular phone 100 obtained by the position measurement processing, namely a position Pb (x', y') and data of the position measurement error HDOPbase calculated on the basis of the algorithm to the position measurement accuracy analysis part 10 as a position measurement result.

Subsequently, the GPS distance and position measurement part 8 shown in FIG. 1 measures a position of the cellular phone 100 by measuring propagation distances of each the incoming radio wave using GPS data DGPS obtained from the radio waves coming from plural GPS satellites and further applying each the propagation distance to triangulation to make an analysis.

Figure 5:
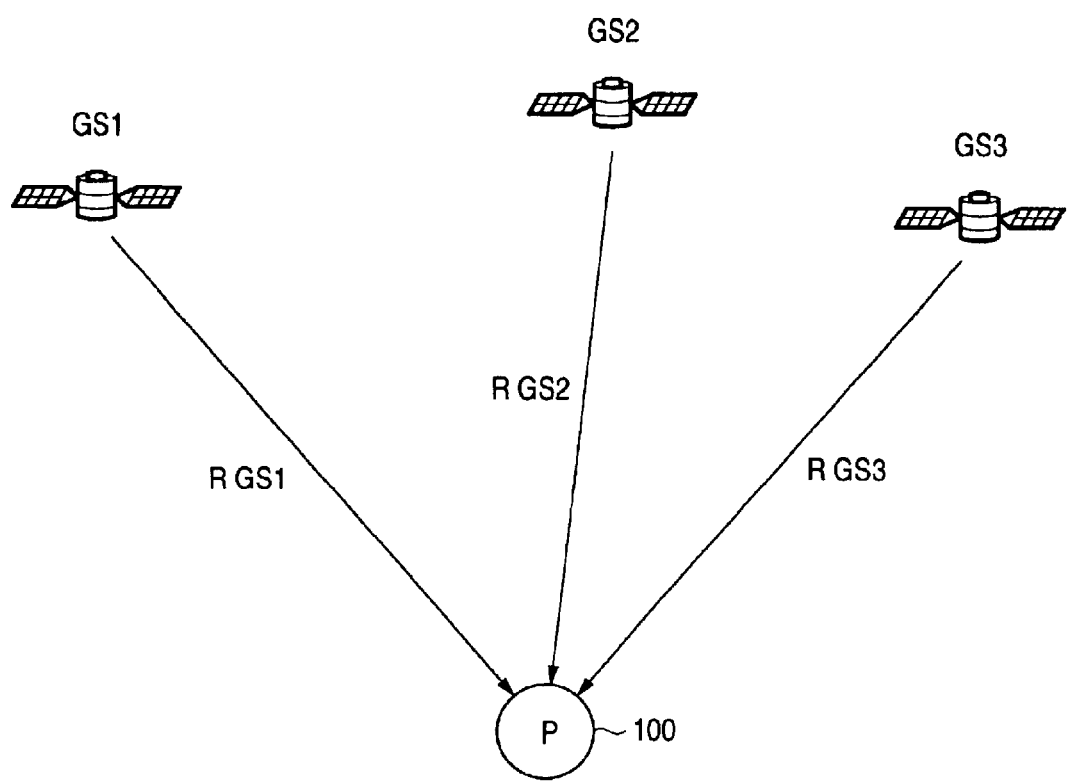
FIG. 5 is a diagram showing a distance measurement principle in the case of obtaining a propagation distance from radio waves coming from GPS satellites.

In other words, when the GPS antenna ANT2 receives radio waves coming from plural (at least three) GPS satellites GS1, GS2, GS3 as illustrated in FIG. 5, the GPS receiving part 7 reproduces GPS data DGPS1, DGPS2, DGPS3 sent from each the GPS satellite GS1, GS2, GS3 by demodulating a received signal outputted from the GPS antenna ANT2 and supplies the data to the GPS distance and position measurement part 8.

Then, the GPS distance and position measurement part 8 obtains propagation time T1 of a radio wave coming from the GPS satellite GS1, propagation time T2 of a radio wave coming from the GPS satellite GS2 and propagation time T3 of a radio wave coming from the GPS satellite GS3 by checking each time information included in the GPS data DGPS1, DGPS2, DGPS3, and further measures propagation distances RGS1, RGS2, RGS3 from each the GPS satellite GS1, GS2, GS3 to the cellular phone 100 by multiplying each the propagation time T1, T2, T3 by a propagation speed c of the radio wave.

Time information with very high accuracy indicating time tg1, tg2, tg3 at which each the GPS satellite GS1, GS2, GS3 emits the radio waves is included in each the time information included in the GPS data DGPS1, DGPS2, DGPS3, and a clock is built into the GPS receiving part 7. Thus, the clock of the GPS receiving part 7 measures time t1 at which a radio wave coming from the GPS satellite GS1 is received, time t2 at which a radio wave coming from the GPS satellite GS2 is received and time t3 at which a radio wave coming from the GPS satellite GS3 is received, and further the GPS distance and position measurement part 8 obtains differences (t1−tg1), (t2−tg2), (t3−tg3) between each the time t1, t2, t3 and the time tg1, tg2, tg3, and sets their differences to the propagation time T1, T2, T3 of the radio waves coming from each the GPS satellite GS1, GS2, GS3.

Further, the GPS distance and position measurement part 8 obtains the present position Pg (x, y) of the cellular phone 100 and a position measurement error HDOPgps by analyzing the propagation distances RGS1, RGS2, RGS3 by triangulation to which the successive approximation method similar to the position measurement processing of the base station distance and position measurement part 9 is applied, and supplies data of these present position Pg (x, y) and position measurement error HDOPgps to the position measurement accuracy analysis part 10 as a position measurement result.

Since the triangulation to which the successive approximation method is applied has been described already, the detailed description is omitted, and the present position Pg (x, y) of the cellular phone 100 using the radio waves coming from the GPS satellites and the position measurement error HDOPgps are obtained by replacing the propagation distances RGS1, RGS2, RGS3 obtained from the radio waves coming from the GPS satellites with the propagation distances RBS1, RBS2, RBS3 obtained from the radio waves coming from the base stations BS1, BS2, BS3 and performing the position and distance measurement processing based on the position measurement algorithm shown by the formulas (1) to (18).

The position measurement accuracy analysis part 10 decides which of the present position Pb (x, y) obtained by the base station distance and position measurement part 9 and the present position Pg (x, y) obtained by the GPS distance and position measurement part 8 to adopt.

Incidentally, details will be described in the operation description below, and by comparing the position measurement error HDOPbase and the position measurement error HDOPgps with a predetermined criterion value, it is decided which of the present position Pb (x, y) and the present position Pg (x, y) to adopt finally.

Also, it is constructed so as to calculate the proper present position of the cellular phone 100 by composite processing described below when both of the present position Pb (x, y) and the present position Pg (x, y) do not satisfy a predetermined criterion.

Next, operations of the cellular phone 100 having such a configuration will be described with reference to a flowchart of FIG. 6.

Figure 6:
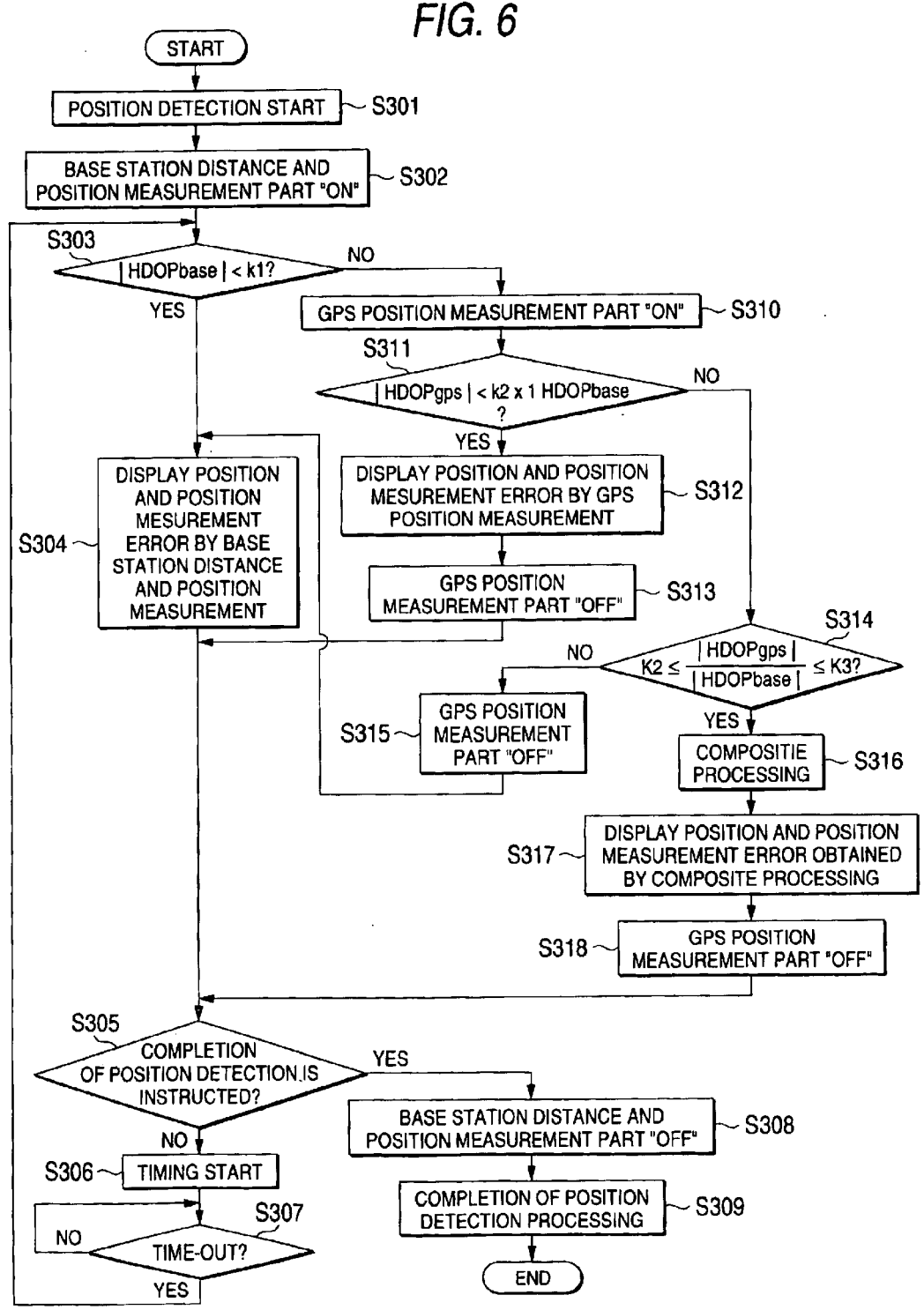
FIG. 6 is a flowchart showing operations of the cellular phone of the embodiment.

In FIG. 6, when the cellular phone 100 is powered on, the control part 6 starts an operation for detecting the present position of the cellular phone 100, and further the sending and receiving part 1 starts to receive radio waves coming from base stations (step S301).

Subsequently, the control part 6 executes application programs or system programs stored in the storage part 11 and thereby a position measurement operation is started by the base station distance and position measurement part 9 (step S302). Then, the base station distance and position measurement part 9 inputs base station data DBASE supplied from the sending and receiving part 1, and measures propagation distances RBS1, RBS2, RBS3 of radio waves coming from at least three base stations by the distance measurement processing described above, and further obtains a position measurement error HDOPbase while measuring the present position Pb (x, y) of the cellular phone 100 by triangulation to which a successive approximation method is applied, and supplies them to the position measurement accuracy analysis part 10 through the control part 6.

Next, in step S303, the position measurement accuracy analysis part 10 compares an absolute value of the position measurement error HDOPbase with a predetermined criterion value k1 and in the case of |HDOPbase|<k1, it is decided that the present position Pb (x, y) obtained should be adopted as a true present position of the cellular phone 100, and the operation proceeds to step S304, and the present position Pb (x, y) and the position measurement error HDOPbase are supplied to the control part 6.

Incidentally, the criterion value k1 is determined by the application program executed by the control part 6. For example, in the case of an application for accurately detecting a position of the particular shop, the control part 6 sets the criterion value k1 in order to perform position detection with accuracy of about 30 m. Also, in the case of an application program for displaying positions of plural mobile units on a map with a large scale ratio or the case of a service control application program of vehicles used in traffic, the control part 6 sets the criterion value k1 in order to perform position detection with accuracy of about 200 m.

Figure 7:
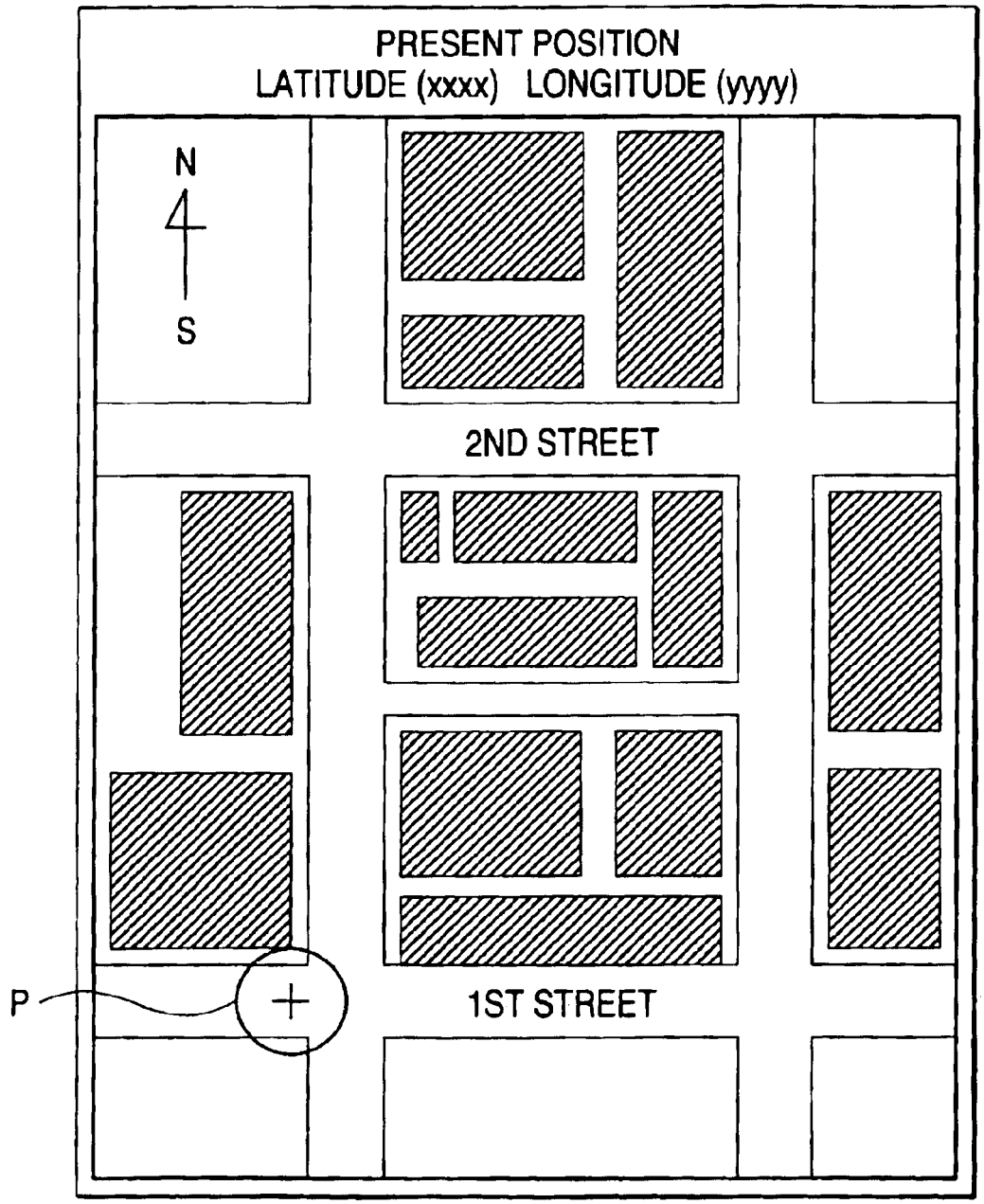
FIG. 7 is a diagram schematically showing a display example of a position measurement result.

Further, in step S304, the control part 6 instructs the display part 5 and displays the present position Pb (x, y) and the position measurement error HDOPbase. Further, the control part 6 makes memory access to the storage part 11 to obtain the present position Pb (x, y) as retrieval data, and acquires map data indicating a map of the surroundings of the present position Pb (x, y), and supplies the acquired map data to the display part 5 to display it. As a result of this, as illustrated in FIG. 7, a prompt P indicating the present position Pb (x, y) is displayed on the map and further the prompt P with, for example, a circle shape in which the center of the prompt P is set to the present position Pb (x, y) and an absolute value of the position measurement error HDOPbase is set to a radius is displayed.

According to instructions of a user from the operation part 4, it is constructed so that the map is not displayed and the present position Pb (x, y) is merely displayed by numeric values of latitude x and longitude y and further the position measurement error HDOPbase is numerically displayed.

When display by the display part 5 is formed, subsequently in step S305, the control part 6 decides whether or not the completion of distance measurement processing is instructed by instructions of a user from the operation part 4 or instructions of a system program. Here, when the completion of the distance measurement processing is instructed, the operation proceeds to step S308 and position measurement processing is completed with respect to the base station distance and position measurement part 9 and further in step S309, the control part 6 also completes position detection of the cellular phone 100.

On the other hand, when the completion of the distance measurement processing is not instructed in step S305, the operation proceeds to step S306 and a predetermined timing value is supplied to the timing part 12 to start timing operations. Then, when the timing part 12 performs the timing operations to the timing value and it becomes a time-out in step S307, the processing from step S303 is repeated under the control of the control part 6.

Subsequently, when a relation between an absolute value of the position measurement error HDOPbase and the criterion value k1 is |HDOPbase|≧k1 instep S303, the operation proceeds to step S310 and the control part 6 starts the GPS receiving part 7 and the GPS distance and position measurement part 8.

Then, the GPS receiving part 7 receives radio waves from GPS satellites and thereby, propagation distances DGPS1, DGPS2, DGPS3 of the radio waves coming from three GPS satellites are measured and further, the GPS distance and position measurement part 8 calculates a position measurement error HDOPgps while measuring the present position Pg (x, y) of the cellular phone 100 by performing position measurement processing by triangulation to which a successive approximation method is applied. Then, these present position Pg (x, y) and position measurement error HDOPgps are supplied to the position measurement accuracy analysis part 10 through the control part 6.

Subsequently, in step S311, the position measurement accuracy analysis part 10 compares a value k2×|HDOPbase| in which an absolute value of the position measurement error HDOPbase previously supplied is multiplied by a predetermined criterion value k2 with an absolute value |HDOPgps| of the position measurement error HDOPgps and in the case of |HDOPgps|<k2×|HDOPbase|, it is decided that the present position Pg (x, y) obtained from the radio waves of the GPS satellites has position measurement accuracy higher than that of the present position Pb (x, y) obtained from the radio waves of the base stations and further, it is decided that the present position Pg (x, y) should be adopted as a true present position of the cellular phone 100.

Incidentally, the criterion value k2 is a decision factor predetermined by experiment in order to make a decision whether or not composite processing described below should be performed and, for example, it is set to k2=0.8.

Then, the operation proceeds to step S312, and the present position Pg (x, y) and the position measurement error HDOPgps are supplied to the control part 6.

Further, in step S312, the control part 6 instructs the display part 5 and displays the present position Pg (x, y) and the position measurement error HDOPgps. Further, the control part 6 makes memory access to the storage part 11 to obtain the present position Pg (x, y) as retrieval data, and acquires map data indicating a map of the surroundings of the present position Pg (x, y), and supplies the acquired map data to the display part 5 to display it. As a result of this, in a manner similar to that illustrated in FIG. 7, a prompt P indicating the present position Pg (x, y) is displayed on the map and further the prompt P with, for example, a circle shape in which the center of the prompt P is set to the present position Pg (x, y) and an absolute value of the position measurement error HDOPgps is set to a radius is displayed.

Incidentally, according to instructions of a user from the operation part 4, it is constructed so that the map is not displayed and the present position Pg (x, y) is merely displayed by numeric values of latitude x and longitude y and further the position measurement error HDOPgps is numerically displayed.

When display by the display part 5 is formed, subsequently in step S313, the control part 6 breaks power supply to the GPS receiving part 7 and further completes position measurement processing with respect to the GPS distance and position measurement part 8 and then, the operation proceeds to step S305. By breaking the power supply to the GPS receiving part 7 in this manner, power consumption of a battery provided in the cellular phone 100 is reduced.

When the position measurement accuracy analysis part 10 decides that there is |HDOPgps|≧k2×|HDOPbase| in step S311 described above, the operation proceeds to step S314.

Instep S314, a ratio |HDOPgps|/|HDOPbase| between an absolute value of the position measurement error HDOPgps and an absolute value of the position measurement error HDOPbase is obtained, and a size relation between the predetermined criterion value k2 and a factor k3 is checked.

Here, when the obtained ratio |HDOPgps|/|HDOPbase| is larger than or equal to the criterion value k2 and is smaller than or equal to the factor k3, namely k2≦(|HDOPgps|/|HDOPbase|)≧k3, it is decided that position measurement accuracy of the position measurement error HDOPgps is substantially equal to that of the position measurement error HDOPbase, and the operation proceeds to step S316.

When the size relation does not hold, it is decided that position measurement accuracy of the present position Pg (x, y) is not good since the position measurement error HDOPgps is large, and the operation proceeds to step S315. Incidentally, the criterion value k3 is a decision factor predetermined by experiment in order to make a decision whether or not composite processing described below should be performed and, for example, it is set to k3=1.2.

Subsequently, when the operation proceeds to step S315, the control part 6 breaks power supply to the GPS receiving part 7 and further completes position measurement processing with respect to the GPS distance and position measurement part 8 and then, the operation proceeds to step S304. Therefore, the present position Pg (x, y) obtained from the radio waves coming from the base stations and the position measurement error HDOPbase are displayed by the display part 5.

On the other hand, when the processing proceeds from step S314 to step S316, the position measurement accuracy analysis part 10 performs composite processing.

Figure 8:
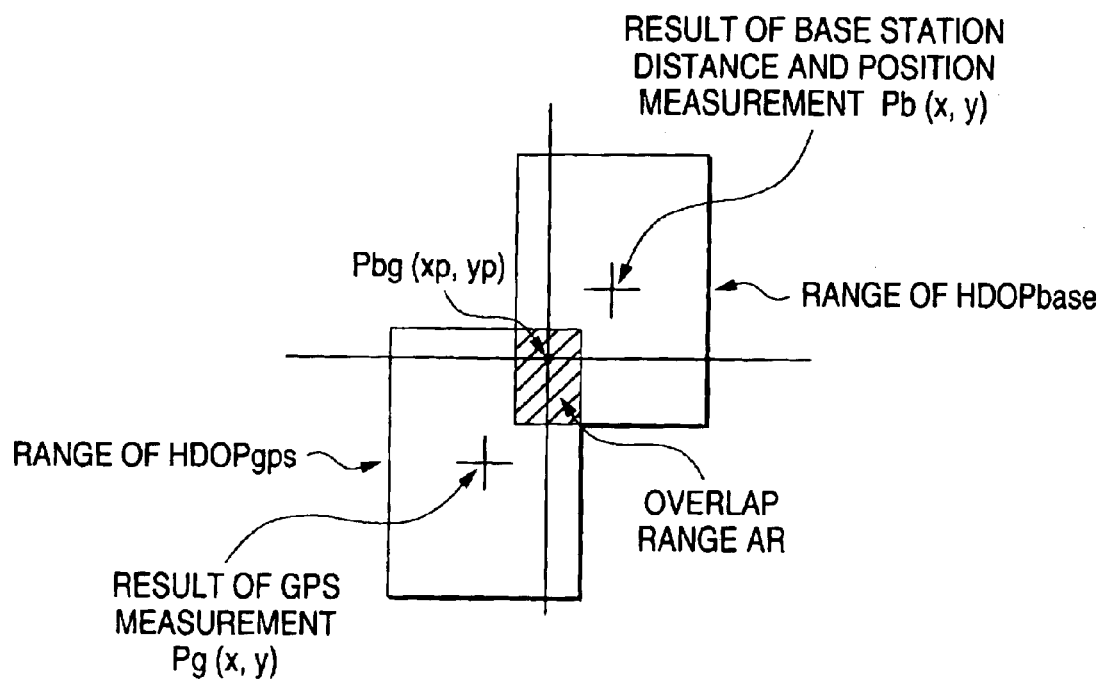
FIG. 8 is a diagram showing a principle of composite processing.

Here, this composite processing is performed as illustrated in FIG. 8. In other words, new latitude xp is obtained by adding and averaging latitude x of the present position Pb (x, y) obtained from the radio waves coming from the base stations and latitude x of the present position Pg (x, y) obtained from the radio waves coming from the GPS satellites and further, new longitude yp is obtained by adding and averaging longitude y of the present position Pb (x, y) and longitude y of the present position Pg (x, y). Then, a new position Pbg (xp, yp) formed by the newly obtained latitude xp and longitude yp is set to a more proper present position.

Further, a range AR of overlap between a range of the position measurement error HDOPbase centering on the present position Pb (x, y) and a range of the position measurement error HDOPgps centering on the present position Pg (x, y) is obtained and the range AR is set to a range of a new position measurement error.

Then, when the new position Pbg (xp, yp) and the range AR are obtained by such composite processing, the operation proceeds to step S317, and data of these position Pbg (xp, yp) and range AR is supplied to the control part 6.

Further, in step S317, the control part 6 instructs the display part 5 and displays the new position Pbg (xp, yp) and the range AR. Further, the control part 6 makes memory access to the storage part 11 to obtain the new position Pbg (xp, yp) as retrieval data, and acquires map data indicating a map of the surroundings of the new position Pbg (xp, yp), and supplies the acquired map data to the display part 5 to display it.

As a result of this, in a manner similar to that illustrated in FIG. 7, the new position Pbg (xp, yp) and the range AR are displayed on the map.

Incidentally, according to instructions of a user from the operation part 4, it is constructed so that the map is not displayed and the new position Pbg (xp, yp) is merely displayed by numeric values of latitude xp and longitude yp and further the range AR of the position measurement error is numerically displayed.

When the composite processing is performed in this manner, as is evident from FIG. 8, the range of the new position measurement error becomes narrower than the ranges of the position measurement error HDOPbase and the position measurement error HDOPgps, and the position measurement error of the new position Pbg (xp, yp) becomes substantially smaller than that of the present position Pb (x, y) and the present position Pg (x, y). As a result of that, the new position Pbg (xp, yp) indicates the present position of the cellular phone 100 more properly.

When display by the display part 5 is formed, subsequently in step S318, the control part 6 breaks power supply to the GPS receiving part 7 and further completes position measurement processing with respect to the GPS distance and position measurement part 8 and then, the operation proceeds to step S305. Then, when the completion of processing from a user is instructed, position detection of the cellular phone 100 is completed.

According to the embodiment thus, improvement in position measurement accuracy is achieved by skillfully combining position measurement using the radio waves coming from the base stations with position measurement using the radio waves coming from the GPS satellites.

Also, it is constructed so that when good position measurement accuracy is not obtained as a result of making the position measurement using the radio waves coming from the base stations, the position measurement using the radio waves coming from the GPS satellites is made and when the result of making the position measurement using the radio waves coming from the base stations is good, the position measurement using the radio waves coming from the GPS satellites is not made. As a result of this, a problem that the GPS receiving part 7 is always operated to cause an increase in power consumption can be eliminated.

Also, even when both the position measurement accuracy of the present position Pb (x, y) obtained from the radio waves coming from the base stations and the present position Pg (x, y) obtained from the radio waves coming from the GPS satellites is not good, more proper present position Pbg (xp, yp) is obtained by the composite processing described above, so that occurrence of a situation incapable of position detection can be prevented before it happens, and exact position information can be provided with respect to a user. Also, according to the composite processing, the present position Pbg (xp, yp) closer to a true present position can be obtained even when the present position Pb (x, y) is obtained from a multi-path wave. Also, even when a user stays inside a building and the present position Pg (x, y) obtained from the radio waves coming from the GPS satellites does not have good position measurement accuracy, the present position Pbg (xp, yp) closer to a true present position can be obtained.

Also, according to the actual experiment results, a distance could be measured with accuracy of a chip rate of about 3.84 MHz. Further, in the general case that the sending and receiving part 1 normally performs data demodulation with resolution of ¼ chip, a distance could be measured with high accuracy of the order of about 19.5 m.

Incidentally, in the embodiment, as illustrated in FIG. 8, in the case of the composite processing described above, new latitude xp is obtained by adding and averaging latitude x of the present position Pb (x, y) obtained from the radio waves coming from the base stations and latitude x of the present position Pg (x, y) obtained from the radio waves coming from the GPS satellites, and also new longitude yp is obtained by adding and averaging longitude y of the present position Pb (x, y) and longitude y of the present position Pg (x, y), and a new position Pbg (xp, yp) formed by the newly obtained latitude xp and longitude yp is set to more proper present position.

In other words, when latitude and longitude of the present position Pb (x, y) obtained from the radio waves coming from the base stations are respectively indicated by (xb, yb) and latitude and longitude of the present position Pg (x, y) obtained from the radio waves coming from the GPS satellites are respectively indicated by (xg, yg), the new latitude xp is obtained as (xb+xg)/2 and the new longitude yp is obtained as (yb+yg)/2.

However, the invention is not limited to such a method and, for example, an absolute value of the position measurement error HDOPbase of the present position Pb (x, y) obtained from the radio waves coming from the base stations is compared with an absolute value of the position measurement error HDOPgps of the present position Pg (x, y) obtained from the radio waves coming from the GPS satellites, and a position closer to the present position Pb (x, y) obtained from the radio waves coming from the base stations may be set to a new position Pbg (xp, yp) in the case of |HDOPbase|<|HDOPgps|, and a position closer to the present position Pg (x, y) obtained from the radio waves coming from the GPS satellites may be set to a new position Pbg (xp, yp) in the case of |HDOPbase|>|HDOPgps|.

In other words, the new position Pbg (xp, yp) between the present positions Pb (x, y) and Pg (x, y) may be determined according to a ratio between the absolute values |HDOPbase| and |HDOPgps| of the position measurement errors.

Also, the cellular phone has been described as one embodiment, but the invention can be widely applied to a mobile communication apparatus used in a mobile communication system such as a PDA, a car navigation system mounted in vehicles or a portable navigation system for care.

What is claimed is:

1. A mobile communication apparatus comprising:
   a base station distance and position measurement part which measures first propagation distances of radio waves coming from base stations and measures a first present position of the mobile communication apparatus from the first propagation distances;
   a GPS distance and position measurement part which measures second propagation distances of radio waves coming from GPS satellites and measures a second present position of the mobile communication apparatus from second propagation distances; and
   a position measurement accuracy analysis part which decides one of the first present position and the second present position to be a true present position of the mobile communication apparatus,
   wherein the base station distance and position measurement part decides a first position measurement error of the first present position, wherein the first position measurement error is decided using measurement results of the first propagation distances of radio waves coming from the base stations and the first present position of the mobile communication apparatus, such that the first position measurement error is decided independent of the radio waves coming from the GPS satellites;
   the position measurement accuracy analysis part compares the first position measurement error of the first present position with a first predetermined criterion; and
   when the position measurement accuracy analysis part decides that the first position measurement error exceeds the first predetermined criterion, the GPS distance and position measurement part measures the second propagation distances and the second present position; and
   the position measurement accuracy analysis part decides that the second present position is adopted as the true present position of the mobile communication apparatus.

2. The mobile communication apparatus as defined in claim 1, wherein the GPS distance and position measurement part decides the second position measurement error of the second present position;

the position measurement accuracy analysis part compares the second position measurement error with a second predetermined criterion;

when the position measurement accuracy analysis part decides that the second position measurement error exceeds the second predetermined criterion, the position measurement accuracy analysis part calculates a third present position within a range of overlap between the first position measurement error and the second position, measurement error; and the position measurement accuracy analysis part decides that the third present position is adopted as the true present position of the mobile communication apparatus.

3. The mobile communication apparatus as defined in claim 1, further comprises a controller which stops an operation of the GPS distance and position measurement part at the time of the distance measurement and position measurement by the base station distance and position measurement part.

4. The mobile communication apparatus as defined in claim 2, further comprises a controller which stops an operation of the GPS distance and position measurement part at the time of the distance measurement and position measurement by the base station distance and position measurement part.

5. A position detection method for detecting a position of a mobile communication apparatus, comprising the steps of:

measuring a first present position of the mobile communication apparatus from radio waves coming from base stations and a first position measurement error;

comparing the first position measurement error with a first predetermined criterion; and measuring a second present position of the mobile communication apparatus from radio waves coming from GPS satellites when the first position measurement error exceeds the first predetermined criterion, wherein the first position measurement error is decided using measurement results of first propagation distances of radio waves coming from the base stations and the first present position of the mobile communication apparatus, such that the first position measurement error is decided independent of the radio waves coming from the GPS satellites.

6. The position detection method as defined in claim 5, further comprising:

measuring a second position measurement error; and comparing the second position measurement error with a second predetermined criterion; and calculating a third present position within a range of overlap between the first position measurement error and the second position measurement error when the second position measurement error exceeds the second predetermined criterion.

7. A mobile communication apparatus comprising:

a first receiver which receives first radio waves coming from base stations;

a second receiver which receives second radio waves coming from GPS satellites;

a first calculator which calculates a first position of the mobile communication apparatus and a first error of the first position from the first radio waves, wherein the first error of the first position is decided using measurement results of first propagation distances of the first radio waves coming from the base stations and the first position of the mobile communication apparatus, such that the first error of the first position is decided independent of the second radio waves comma from the GPS satellites;

an analyzer which compares the first error with a first predetermined criterion; and a second calculator which calculates a second position of the mobile communication apparatus and a second error of the second position from the second radio waves, wherein the analyzer decides the second present position to be a true present position of the mobile communication apparatus.

8. The mobile communication apparatus as defined in claim 7, wherein the second calculator is turned on to calculate the second propagation distances and the second position when the analyzer determines that the first error exceeds the first predetermined criterion.

9. The mobile communication apparatus as defined in claim 7, wherein the analyzer calculates the third position when the analyzer compares the second error with a second predetermined criterion and decides that the second error exceeds the second predetermined criterion; and the analyzer decides the third position to be the true present position of the mobile communication apparatus.

10. The mobile communication apparatus as defined in claim 9, wherein the analyzer calculates a third position within a range of overlap between the first error and the second error.

11. A mobile communication apparatus comprising:

a first receiver which receives first radio waves coming from base stations;

a second receiver which receives second radio waves coming from GPS satellites;

a first calculator which calculates a first position of the mobile communication apparatus and a first error of the first position based on the first radio waves, wherein the first error of the first position is decided using measurement results of first propagation distances of the first radio waves coming from the base stations and the first position of the mobile communication apparatus, such that the first error of the first position is decided independent of the second radio waves coming from the GPS satellites; and a second calculator which calculates a second position of the mobile communication apparatus and a second error of the second position based on the second radio waves, wherein an analyzer calculates a third position based on the first position including first error and the second position including a second error, and decides the third position to be a true present position of the mobile communication apparatus.

12. The mobile communication apparatus as defined in claim 11, wherein the analyzer calculates the third position within a range of overlap between the first error and the second error.

* * * * *